US006970251B2

(12) United States Patent
Vikhagen

(10) Patent No.: US 6,970,251 B2
(45) Date of Patent: Nov. 29, 2005

(54) METHOD FOR VIBRATION MEASUREMENT AND INTERFEROMETER

(75) Inventor: Eiolf Vikhagen, Trondheim (NO)

(73) Assignee: Optonor AS, Trondheim (NO)

( * ) Notice: Subject to any disclaimer, the term of this patent is extended or adjusted under 35 U.S.C. 154(b) by 249 days.

(21) Appl. No.: 10/221,161

(22) PCT Filed: Mar. 22, 2001

(86) PCT No.: PCT/NO01/00125

§ 371 (c)(1),
(2), (4) Date: Sep. 18, 2002

(87) PCT Pub. No.: WO01/73373

PCT Pub. Date: Oct. 4, 2001

(65) Prior Publication Data

US 2003/0037616 A1 Feb. 27, 2003

(30) Foreign Application Priority Data

Mar. 24, 2000 (NO) .................................. 20001539

(51) Int. Cl.⁷ ............................................. G01B 11/02
(52) U.S. Cl. ..................................................... 356/496
(58) Field of Search .............................. 356/35.5, 496, 356/498, 511, 512, 513, 514; 73/655, 657

(56) References Cited

U.S. PATENT DOCUMENTS 5,827,971 A * 10/1998 Hale et al. .................... 73/657
6,486,959 B2 * 11/2002 Delaye et al. ............. 356/457
6,587,212 B1 * 7/2003 Barber et al. ............... 356/502

FOREIGN PATENT DOCUMENTS

| GB | 2259139 | 3/1993 |
| JP | 08-114412 | 5/1996 |
| WO | 98/38476 | 9/1998 |
| WO | 00/03197 | 1/2000 |
| WO | 00/14477 | 3/2000 |

* cited by examiner

Primary Examiner—Samuel A. Turner
(74) Attorney, Agent, or Firm—Dennison, Schultz, Dougherty & MacDonald

(57) ABSTRACT

A Method for measuring vibrations in small and microscopic objects is disclosed. The method includes the steps of vibrating the object at a frequency, illuminating the object with a light source which is phase modulated at the same frequency, collecting data from a detector array, operating an algorithm to calculate the size of interference modulation between the light waves, operating an algorithm based on multiple calculation of the modulation at different vibration phases between the excitation of the object on one hand, and the reference phase modulation on the other, and operating an algorithm based on use of the result from the calculation of the second modulation, calculating amplitude values and phase values for the vibration of the surface of the object.

8 Claims, 5 Drawing Sheets

METHOD FOR VIBRATION MEASUREMENT AND INTERFEROMETER

BACKGROUND OF THE INVENTION

Nowadays there are a number of optic interferometry techniques and instruments for measuring geometric sizes such as distance, surface form, dimensions, movement and vibration. The most common technique for vibration analysis is based on so-called laser doppler velocimetry (LDV). Using this technique the vibrations are measured at a single point such that the movement of the measured object on this single point results in wavelength shifts in the incident light reflected from the point. The shift in wavelength is given from the amplitude and frequency of the object. Using measuring systems based on LDV, one may scan the beam over an object area to get information about the object vibrations over a complete range.

Another well-known method is holographic interferometry based on illumination of the entire object using an expanded laser beam. The reflected laser light illuminates a light sensitive glass plate (hologram) together with a reference beam coherent to the object light. An interference pattern is registered in the hologram, and after developing one may recreate an image of the object superimposed, showing so-called interference fringes, providing information about the movements of the object. Such recording of vibration is called time averaging recording, because the light sensitive plate is exposed over a time period which is equal to or larger (often far larger) than the vibration period of the object. There is also an electronic version of holographic interferometry, where the glass plate is replaced by a video camera. This technique is known as ESPI (Electronic Speckle Pattern Interferometry) or TV-holography [1], [2].

Using TV-holography, the vibration is presented as a video image of the object with fringes indicating the amplitude distribution of the vibration. There are also numeric versions of TV-holography. One of these uses pulsed illumination to give quantitative and numeric information about the vibration amplitude distribution and phase distribution of the object [3].

When interferometry measurements occur on objects with surfaces, resulting in diffuse reflection of the incident light, the measurement is usually called a speckle interferometry measurement. The denotation "speckle" is referring to coherent light, such as laser light, getting a granulated and irregular nature after reflection from a diffusely reflecting surface.

Measuring movement on specular surfaces may be made by simpler interferometry setups, where for example a light beam from a laser is divided in two by a beam divider. The first light wave is sent in towards the object being measured, the other towards an ordinary mirror. The two reflected light waves are combined again and are superimposing each other, and the light waves are captured by a detector or a detector array which also may register the interference term arising from the superimposition of the two waves. When the object is moving, the intensity in the interference term will be modulated, and thereby give information about the movements of the object.

There are also other variants of interferometers, for example interferometers based on white light or other low coherent light sources. Such systems are commonly used in combination with microscopic rendering for measuring the surface form (the topography) of microscopic objects. Using low coherent sources, interference between the two interfering light waves is achieved only when the object light and the reference light are travelling the same distance after the splitting in the beam divider. As an example, by moving the object in a direction towards or away from the beam divider, distances may be registered at which interference arises in the different parts of the surface, and in this manner find the surface topography of the object being investigated.

The principle of all the aforementioned methods have clear, mutual characteristics, as all of them are based on interferometry between two or more light waves.

MEASURING MEMS's AND MICROSCOPIC STRUCTURES

Measurement of the vibrations in microscopic structures has met an increasing interest in many research and development environments, especially with regard to so-called MEMS (Micro Electro Mechanical Systems). Generally, a MEMS is a membrane based device in the size down to 0.1 mm or smaller, and is a typical sensor to measure dimensions such as pressure, force, acceleration, temperature etc. Furthermore, MEMS's also have functional features directly linked to their dynamical features. Therefore, vibration measurements by MEMS's are of great interest in research environments, and measuring systems for complete range vibration measurements are, according to statements from prominent MEMS researchers, not available.

OBJECT OF THE INVENTION

The main object of the invention is to provide a method and a device for measurement of microscopic vibration, which can accomplish measurements with an increasing sensitivity compared to known methods and equipment. Further objects will appear from the description below.

THE INVENTION

According to its object, the invention combines a microscopic rendering system with an interferometer and a vibrating object holder at the same time, such that the measuring system itself may control the vibration (excitation) of the object at the same time as the measuring system also uses a record and calculation algorithm, such that the vibration amplitude and the vibration phase of the object can be calculated for every single point or area on the surface of the object. The invention is based on the fact that the object is vibrating at one frequency at a time, and that the object may be vibrating over a given period in time, generally some seconds or minutes, at the same frequency and the same amplitude.

The vibrating object holder may have one or more excitation modes that may operate at the same time in a co-ordinated way. These modes can be:
Out of plane and in-plane excitation (all three main directions)
Torsion rotation (about all three main axis)

The object excitation unit may be mounted rigidly in the microscopic interferometer or it may be more modular, such that it may be loosened relative to the interferometer. If the object being measured has its own separate excitation mechanism, for example as some microscopic transducers have, the control unit of the invention may then alternatively control the excitation by sending signals directly to the object instead of the object excitation unit OEU.

The invention is based on so-called mean time recording, that is the detector unit or the detector array calculates the mean over a period equal to an object vibration period (1/frequency [sec]) or eventually over a large number of vibration periods. The invention is also based on the fact that the vibration amplitude (peak-to-peak) of the object does not exceed a given size, as described further below.

The invention comprises a system for illuminating the microscopic object with a light source, leading to light being reflected and rendered via a lens and eventually via more reflecting surfaces and into a detector array. At the same time, another light beam, the reference beam, which is coherent to the object light, is sent in towards the same detector array, such that the array is being illuminated by both the object wave and the reference wave at the same time. The two waves interfere, and the angle between the two incident waves is held so small that the detector array may resolve and register the arising interference term.

A control unit may change the optical phase of the reference light, or alternatively of the object light, in a controlled manner by means of a device as for example a mirror mounted on a piezoelectric transducer, or for example an electro-optical modulator. This controlled phase change in the reference and/or object light should be done both dynamically at the same frequency as the vibration frequency of the object and also in discrete steps. A common way within the field of interferometry, for measuring deformations and surface topography, is to change the optical phase in discrete steps.

EXAMPLE

The invention is illustrated in the drawings, where

Figure 1:
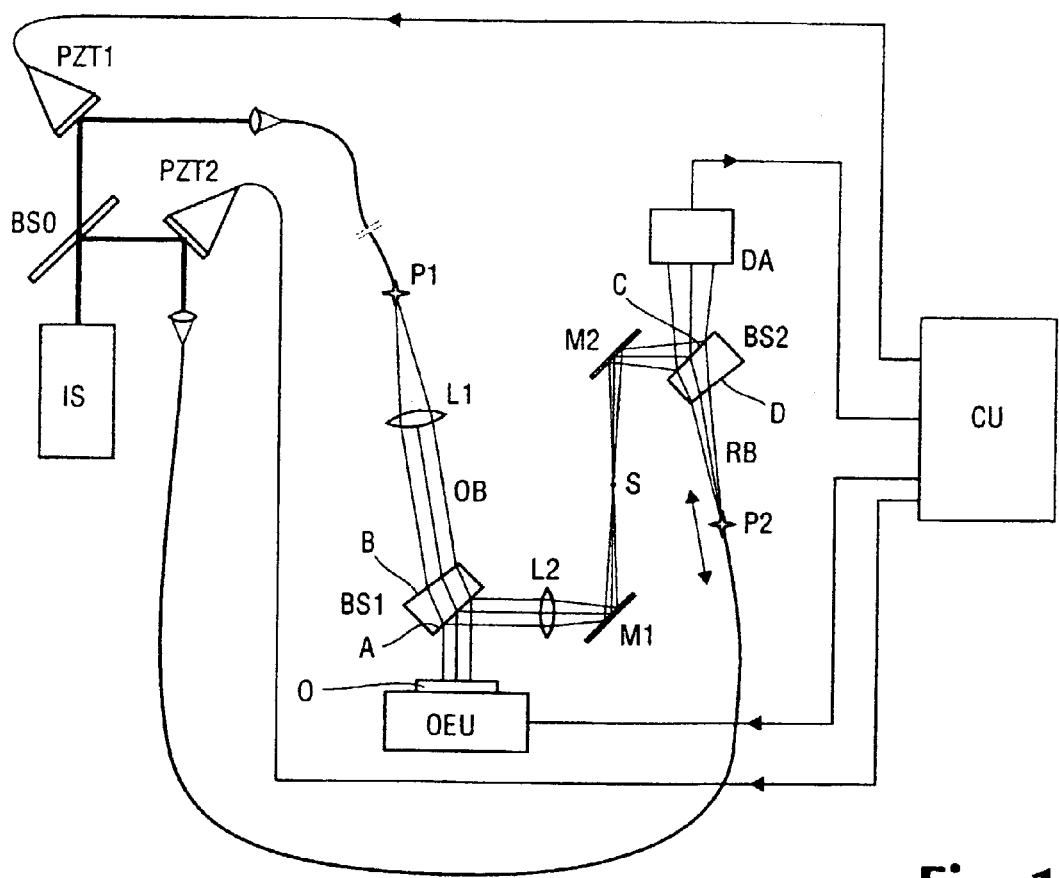
FIG. 1 shows an example of an embodiment schematically.

FIG. 1 shows an example of a preferred embodiment of the invention. The light from point P1 travels through lens L1, which collimates the light to a plane parallel wave OB. The wave OB travels through a glass plate BS1, which is partly reflecting in the surface A. To avoid uncertain effects from multiple reflexes in the surfaces A, B, the glass plate BS2 may generally be wedge-shaped, such that the surfaces A, B are not parallel. Further, the light OB travels down on the object O mounted on the excitation unit OEU. The light is reflected from the object O which may have a specular reflecting surface and/or a diffuse reflecting surface.

Some of the light reflected from the object is then reflected from surface A on BS1 and further through the rendering lens L2, generally being a microscope objective lens or another lens system. Further, the light travels via two mirrors M1, M2 (M1 and M2 are not functionally important) and via another glass plate BS2 having a partly reflecting surface C, and into a detector array DA. The lens L2 provides an image of the surface of the object on the detector array DA. If the object has a plane and specular surface, all the light from the object will pass through the point S in FIG. 1 (focus for lens L2). If the object surface reflects the light diffusely, not all the light coming through lens L2 from the object will go through the point S, but still the light will be collected to an image on the detector array DA.

The light from the point P2 in FIG. 1 represents the reference beam. The reference beam travels through the glass plate BS2, being generally wedge-shaped such that the surfaces C, D are not plane parallel and such that multiple reflexes between the surfaces C, D are not reaching the detector array DA having an incident angle giving interference effects, which can be resolved by the detector array. The reference beam may pass or may not pass a collimating lens. In case the collimating lens is not used, a natural choice. for the position of the point P2 will be an optic distance from the detector array equal to the optic distance from point S and to the detector array.

The light from the points P1 and P2 is completely or partially coherent with each other, such that the light beams from the two points interfere in areas where they are superimposing. The illumination point P2 may be fastened to a translation mechanism, such that the distance between P2 and the detector array DA can be changed in case lens L2 is replaced by a lens system having a variable focal length (zoom lens), or in case the lens L2 is moved or replaced with another lens or lens system, such that the position of the point S is changed.

FIG. 1 shows the invention provided with a light source IS, where the light first is split by means of a beam divider BSO. The two light beams are travelling via two mirrors, one for each of the beams, mounted on their respective piezoelectric transducer (PZT1 and PZT2 in FIG. 1) before the light beams are led into their respective optical fibre. Alternatively, the light beams may travel through their respective electro-optic modulator or another phase modulating unit instead of via the two PZT's.

The two fibres can maintain polarization. One fibre leads the light to point P1, and represents the object light, while the other fibre leads the light to point P2, and represents the reference light. Alternatively, only one single piezoelectric transducer PZT may be used, in this case it can be moved both by harmonic frequency and a superimposed stepwise step function. In FIG. 1 one of the PZT will be used for dynamic modulation while the other PZT will be used for the phase-step function at the same time. Alternatively, the PZT's may also be arranged such that either only the object light or only the reference light is travelling via the mirrors on both PZT's. It is also possible to place the PZT's in relation to some of the optical components (mirrors) between the rendering lens L2 and the detector array DA.

The interferometer may have other structures, as long as it is possible to shift the phase of the reference light and/or the object light. For example, the illumination of the object may be done by the rendering lens L2, for example using a beam divider between the lens L2 and the detector array DA, and for example such that the illumination point for the object light coincides in a virtual way with point S in FIG. 1. FIG. 1 shows an interferometer with optical fibres. It is possible to structure the interferometer without using fibres.

The control unit CU of the invention has three main functions: It controls the phase modulation or phase changes in the reference and/or the object light, it controls the object excitation unit and it controls the collection and digitalization of measuring data from the detector array DA.

About Phase Shifts

Changing or controlling the phase of the reference light and/or the object light in optical interferometers is known from the literature. A typical application is to use so-called "Phase Stepping" or "Phase Shifting" [4] which is used to decide the phase difference between the two light beams numerically. The technique is based on collecting three or more measuring values from the detector (or three or more complete range measuring sets—images—from the detector array) and performing a controlled phase shift in one wave relative to the other wave between the collecting of the three or more measuring sets. Then, by means of given calculation algorithms, the phase difference between the two light waves may be calculated.

If two coherent light waves, as in our case an object wave Io and a reference wave Ir incide to a plane having coordinates (x, y), for example a detector array, and where Io and Ir represent the intensity in the two waves, the intensity I(x, y) over the plane or detector array will be given as:

$$I(x, y) = Io(x, y) + Ir(x, y) + 2 \times P \times SQRT[Io^2(x, y) + Ir^2(x, y)] \times \cos(\alpha(x, y)) \quad (1)$$

where P is a factor with a value between 0 and 1, dependant on the polarization of the light waves and the degree of coherence, and $\alpha(x, y)$ is the phase difference between the two light waves at the point (x, y).

The term $(2 \times P \times SQRT[Io^2(x, y) + Ir^2(x, y)]) = M(x, y)$ represents the modulation term or the interference term. The equation can be simplified to:

$$I(x, y) = B(x, y) + M(x, y) \times \cos(\alpha(x, y)) \quad (2)$$

where B(x, y) is the background at the point (x, y) and M(x, y) represents the modulation at the point (x, y).

Measuring static movements or also measuring surface form, the phase $\alpha(x, y)$ will give the desired information, as movements of the object lead to a change in the phase $\alpha(x, y)$. Measuring vibration by means of the mean time method, the size of M(x, y) will be influenced when the detector calculates the mean over a single or a large number of vibration periods, as the size or the intensity in the term M(x, y) elapses as a Bessel function when the vibration amplitude is increased in the point (x, y) [1].

The Algorithm Used in the Invention

The invention implies use of an algorithm where the modulation size M(x, y) is calculated while the reference or object light is modulated at the same frequency, but at a different mutual vibration phase.

There are three unknown sizes on the right side in the equation (2), and to be able to calculate the modulation size M(x, y), at least three measured values must be collected for the intensity I(x, y) in equation (2). This is done by collecting three or more so-called phase shifted data sets or images with different values of $\alpha(x, y)$ while the control unit CU at the same time controls the vibrations of both the object and the one PZT in the interferometer. This procedure is repeated three or more times, such that data is collected and M(x, y) is calculated three or more times, but every time with different phase difference $\theta$ between the object excitation and the reference excitation.

An example of a suitable recording procedure is as follows:

1. The control unit CU vibrates the object at a frequency F. At the same time, also PZT1 (or PZT2) in FIG. 1 is excited, with the same frequency F and with an arbitrary phase difference $\theta$ between the object excitation and the PZT excitation. The amplitudes of the reference excitation and the object excitation respectively, have adjusted values such that the vectorial sum of the deflection on the object and the PZT1 is not exceeding a certain defined value, as described below.
2. The voltage on the other PZT in FIG. 1, PZT2, is set to 0, and a data set (data image) from the detector array is collected. The data set is digitalized and is saved and is denoted A1.
3. The voltage on PZT2 in FIG. 1 is changed such that the phase difference $\alpha$ between the reference light and the object light is changed with further $\pi/2$ radians, and a new data set denoted A2 is collected.
4. The voltage on PZT2 in FIG. 1 is changed such that the phase difference $\alpha$ between the reference light and the object light is changed with further $\pi/2$ radians, and a new data set denoted A3 is collected.
5. The voltage on PZT2 in FIG. 1 is changed such that the phase difference $\alpha$ between the reference light and the object light is changed with further $\pi/2$ radians, and a new data set denoted A4 is collected.
6. The modulation M1=SQRT[(A1−A3)(A1−A3)+(A2−A4)(A2−A4)] is calculated. Both M1 and A1 to A4 are functions of the position (x, y). Consequently, the modulation value is calculated for each of the detector elements in the detector array DA.
7. The stages 1 to 6 above are repeated three times but at a phase difference between the object excitation and the PZT excitation equal to $(\theta+\pi/2)$, $(\theta+\pi)$ and $(\theta+3\pi/2)$ respectively. In this way further three modulation values M2, M3 and M4 are calculated.
8. An approximated value of the amplitude of the object can be calculated as Amplitude=C1×SQRT[(M1−M3)(M1−M3)+(M2−M4)(M2−M4)]. C1 is a constant. The amplitude is a function of the position (x, y).
9. An approximated value of the phase of the object can be calculated as Phase=C2×ARCTAN[(M2−M4)/(M1−M3)]. C2 is a constant. Phase is a function of the position (x, y).

The recording and the calculations can also be performed with another number of images collected, and with other calculation algorithms for the size of M(x, y). For example, the modulation can be calculated by so-called max-min scanning as described in [5]. The important point here is that the modulation M(x, y) is calculated for three or more different phase values of $\theta$, and that this gives basis for the calculation of the amplitude distribution and phase distribution of the object vibration at the actual frequency F. Another precaution is that the vectorial sum of the object vibration and the harmonic phase modulation is not exceeding the amplitude corresponding to the amplitude in the $1^{st}$ dark stripe in the Bessel function [1].

Another recording algorithm similar to that described here is described in reference [6], but here it is measured on so-called speckle images from macroscopic objects, where one after the filtration and the rectifying of the video signal gets images which to a certain degree correspond to the data sets or the images M1 to M4 in the description above. The method described in the reference [6] does not comprise the points 2 to 6 over, and cannot be used for microscopic objects with a specular surface, as such microscopic data sets or images do not give stripes or speckle patterns with information about the vibration of the object as a speckle TV holographic image does. The points 2 to 6 in the algorithm over are decisive to get information about vibrations in microscopic objects with a specular surface.

Figure 2:
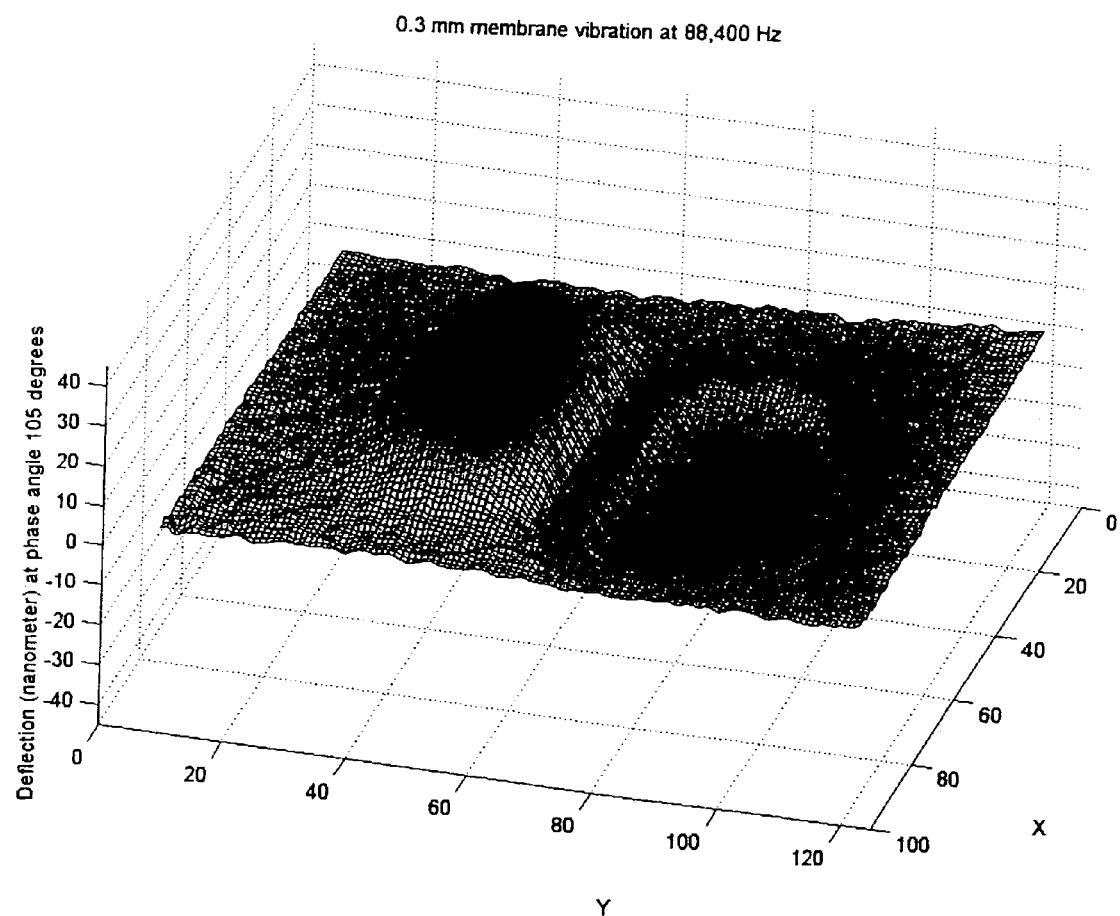
FIG. 2 shows a 3 dimensional plot of the detection accomplished in the equipment illustrated in FIG. 1.
Figure 3:
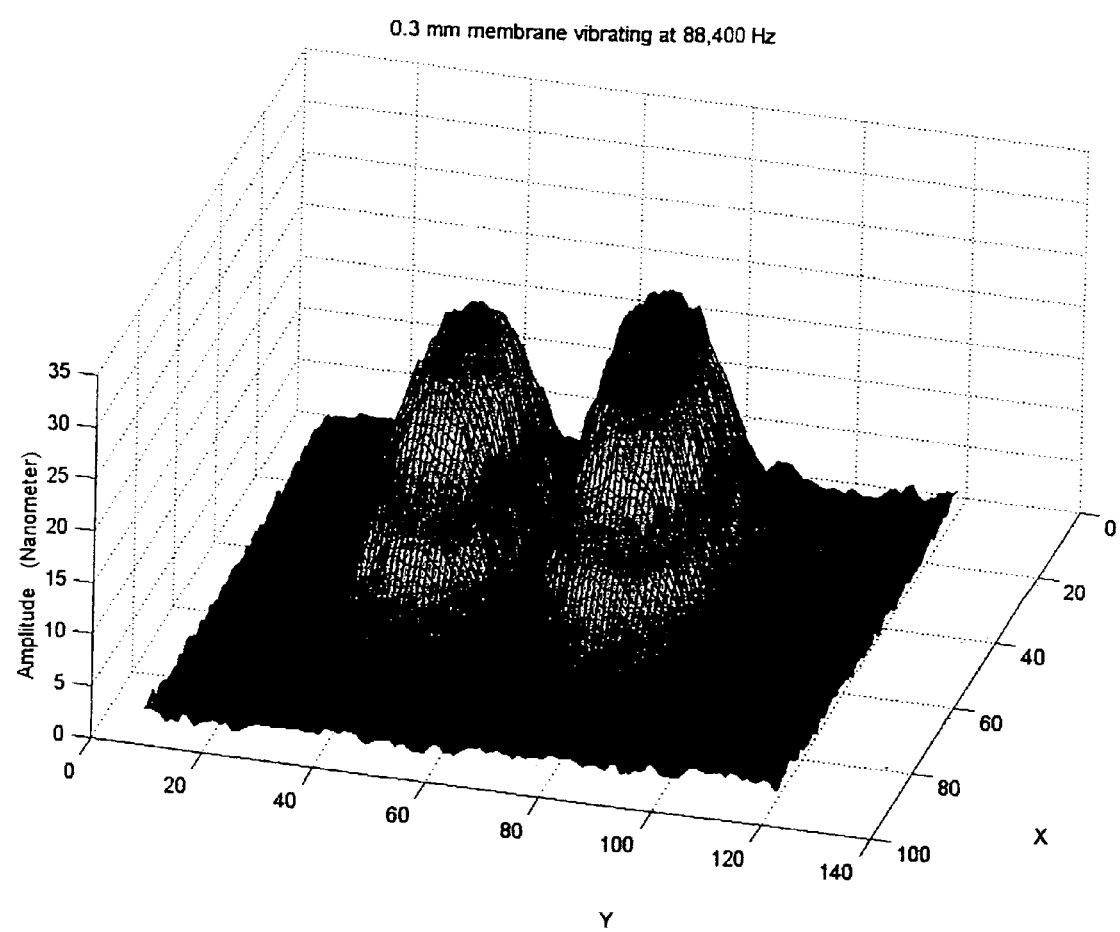
FIG. 3 shows the amplitude distribution for the vibration in FIG. 2.
Figure 4:
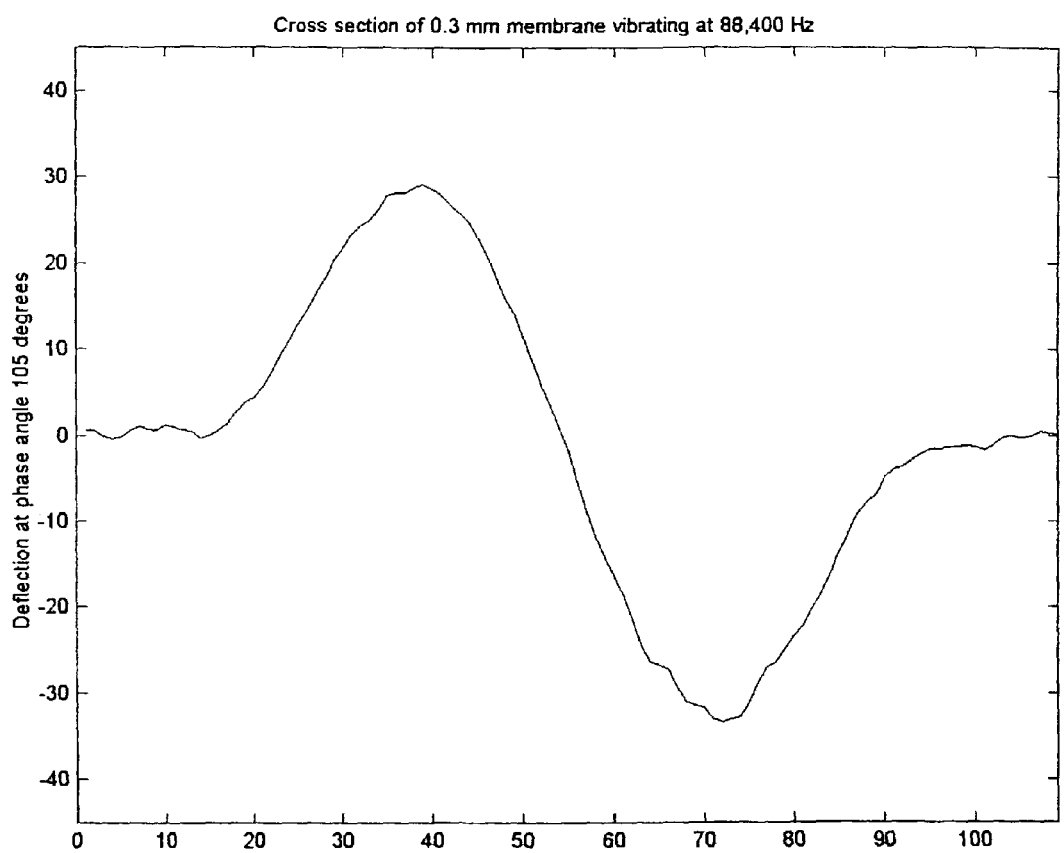
FIG. 4 shows a plot along a line over the measuring image.
Figure 5:
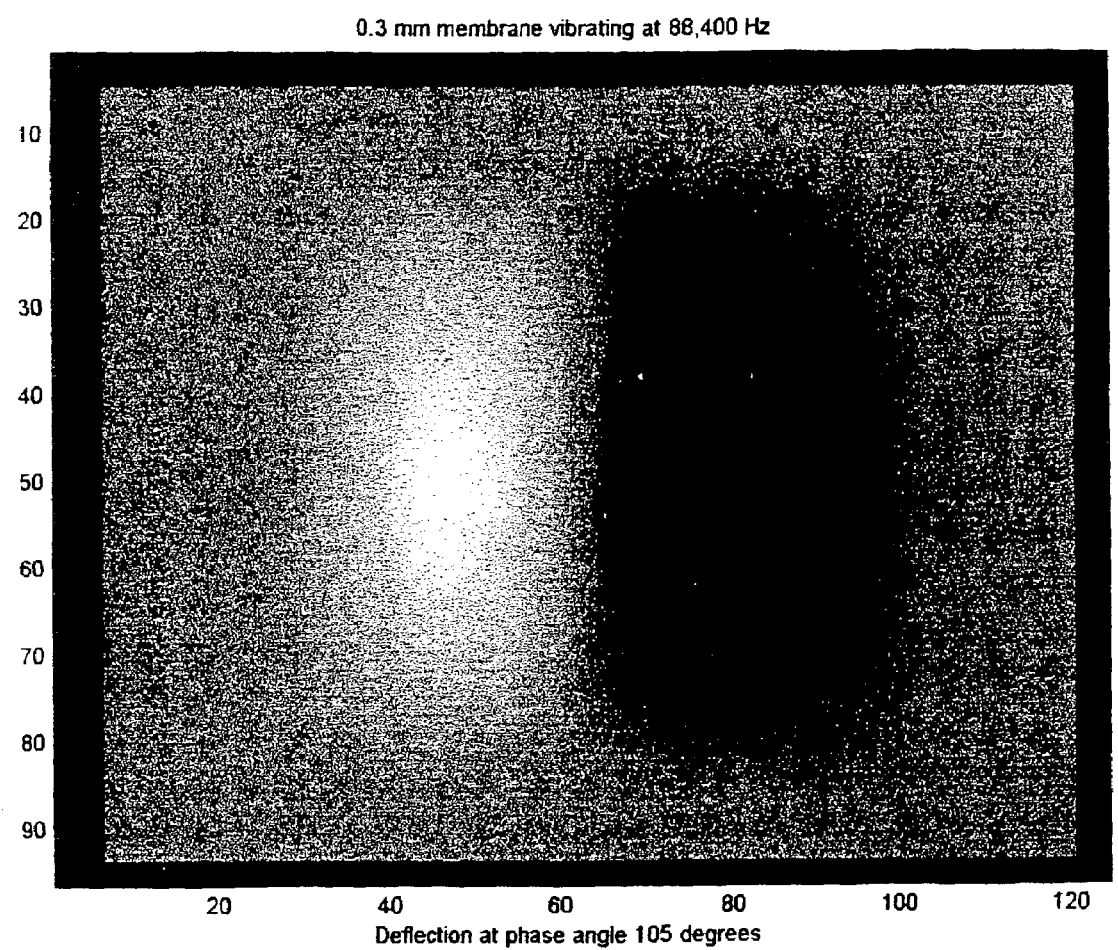
FIG. 5 shows the detection in 2 dimensional representation.

The invention also implies that the deflection of the microscopic object can be calculated for different phase values of the vibration:

$$\text{Deflection}(x, y) = 0.5 \times \text{Amplitude}(x, y) \times \cos(\text{Phase}(x, y) + \beta) \quad (3)$$

where the Amplitude(x, y) and Phase(x, y) is the amplitude (peak-to-peak) and the phase in point (x, y) respectively. $\beta$ is an arbitrary chosen phase in the area between 0 to $2\pi$ radians. The deflection can be plotted for example in a 3 dimensional plot as shown in FIG. 2, where the deflection of a 0.3 mm membrane at the phase β=105 degrees of angle is shown. By plotting the deflection for several (for example 20) different phases β distributed in the interval [0, 2π](=[0, 360 degrees of angle]), and to show these plots sequentially on a screen etc., an animated display is achieved, showing the vibration of the object in slow motion. FIG. 3 shows the amplitude distribution for the same vibration as shown in FIG. 2. FIG. 4 shows a plot along a line over the measuring image, and such images can also be shown as animations by showing the images for different vibration phases β.

The invention can also be used to measure static deformation and also surface topography. Such measurements take basis in the size α(x, y) in the description over.

REFERENCES

[1] Ole Johan Løkberg, "Electronic Speckle Pattern Interferometry", Phys. Technol. Vol. 11, 1980, pages 16–22.
[2] Kåre Høgmoen and Ole Johan Løkberg, "Detection and measurement of small vibrations using electronic speckle pattern interferometry", Applies Optics, Vol 16(7) July 1977, pages 1869–1875.
[3] Jeremy Davies and Clive Buckberry. "Laser Interferometry: Quantitative Analysis of Interferograms", Proc. SPIE Vol. 1162, 1989, pages 279–292.
[4] Katherine Creath, "Phase-shifting speckle interferometry", Applied Optics Vol. 24(18), September 1985, pages 3053–3058.
[5] Eiolf Vikhagen, "Vibration measurement using phase shifting TV-holography and digital image processing", Optics Communications, Vol. 69(3/4), January 1989, pages 214–218.
[6] Svein Ellingsrud og Geir Ove Rosvold, "Analysis of data-based TV-holography system used to measure small vibration amplitudes", Journal of the Optical Society of America A, Vol 9(2), February 1992, pages 237–251.

What is claimed is:

1. Method for measuring vibrations in small and microscopic objects, comprising the steps of:
   vibrating the object at an excitation frequency,
   illuminating the object with a light source producing a light wave which is phase modulated at the same frequency,
   collecting data from a detector array,
   illuminating the detector array with a reference wave which is at least partly coherent to the light wave which is illuminating the object,
   phase modulating the reference light wave or the object light wave with a freguency equal to or nearly equal to the object excitation freguency,
   operating an algorithm to calculate the size of interference term between the object and reference light wave for all points on the detector array,
   operating an algorithm based on multiple calculation of the interference term at different vibrations phases between the excitation of the object, and the phase modulation of the object light wave or reference light wave, and
   operating an algorithm based on use of the result from the calculation of the above interference terms to calculate the amplitude values and phase values for the vibration of the surface of the object.

2. Method according to claim 1, further comprising the steps of:
   at least two dimensional plotting of the vibration deflection of the object for different vibration phases, and
   sequentially displaying these plots on a screen, thereby presenting the vibration of the object as an animation.

3. Method according to claim 1, further comprising the steps of:
   plotting along lines of the vibration deflection of the object for different vibration phases, and
   sequentially displaying these plots on a screen, thereby presenting the vibration of the object as an animation.

4. Interferometer to measure vibrations in small and microscopic objects, comprising:
   a first light source illuminating the object to have light wave reflected from the object,
   a device to provide at least one reference beam of light wave which is at least partly coherent to the light wave of the first light source,
   a detector array to receive light wave reflected from the object and to receive the reference light wave,
   a vibrating object holder for holding the object,
   a control unit for vibrating the object along at least one of the main directions: out-of-plane corresponding to the z-direction and in-plane corresponding to the x and y directions,
   a vibrating phase modulating means in connection with one of the interfering light waves, and
   a phase shifting means which phase shifts one of the interfering waves.

5. Interferometer according to claim 4, comprising a means for providing torsional oscillation about one of the axis x, y, z.

6. Interferometer according to claim 4, the means for phase modulating being integrated.

7. Interferometer to measure vibrations in small and microscopic objects, comprising:
   a first light source illuminating the object to have light wave reflected from the object,
   a device to provide at least one reference beam of light wave which is at least partly coherent to the light of the first light source,
   a detector array to receive light reflected from the object and to receive the reference light wave,
   a vibrating object holder for holding the object,
   means for providing torsional oscillation about one of the axis x, y, z,
   a vibrating phase modulating means in connection with one of the interfering light waves, and
   a further phase modulating means which phase shifts one of the interfering waves.

8. Interferometer according to claim 7, said means for phase modulating being integrated.

* * * * *